(12) United States Patent
Gebhardt et al.

(10) Patent No.: US 11,920,965 B2
(45) Date of Patent: Mar. 5, 2024

(54) METHOD FOR NON-INTRUSIVELY DETERMINING THE TEMPERATURE OF A FLUID FLOWING THROUGH A CONDUIT PORTION

(71) Applicant: ABB Schweiz AG, Baden (CH)

(72) Inventors: Joerg Gebhardt, Mainz (DE); Guruprasad Sosale, Weinheim (DE); Andreas Decker, Darmstadt (DE); Wilhelm Daake, Petershagen (DE); Juergen Horstkotte, Enger (DE); Peter Ude, Hanau (DE); Paul Szasz, Plankstadt (DE); Ulf Ahrend, Karlsruhe (DE)

(73) Assignee: ABB Schweiz AG, Baden (CH)

( * ) Notice: Subject to any disclaimer, the term of this patent is extended or adjusted under 35 U.S.C. 154(b) by 626 days.

(21) Appl. No.: 17/013,676

(22) Filed: Sep. 7, 2020

(65) Prior Publication Data

US 2020/0408580 A1 Dec. 31, 2020

Related U.S. Application Data

(63) Continuation of application No. PCT/EP2019/055618, filed on Mar. 6, 2019.

(30) Foreign Application Priority Data

Mar. 8, 2018 (EP) ..................................... 18160815

(51) Int. Cl.
*G01F 1/688* (2006.01)
*G01K 13/02* (2021.01)
(Continued)

(52) U.S. Cl.
CPC ........... *G01F 1/6884* (2013.01); *G01K 13/02* (2013.01); *G01K 7/427* (2013.01); *G01K 13/024* (2021.01)

(58) Field of Classification Search
CPC ...... G01F 1/6884; G01K 13/02; G01K 7/427; G01K 13/024
See application file for complete search history.

(56) References Cited

U.S. PATENT DOCUMENTS 4,415,279 A * 11/1983 Beuse .................... G01K 17/08
73/204.13
6,824,305 B1 * 11/2004 Boyd .................... G01N 25/18
374/29
(Continued)

FOREIGN PATENT DOCUMENTS

CN 101720420 A 6/2010
CN 104062034 B 9/2014
(Continued)

*Primary Examiner* — Nathaniel T Woodward
*Assistant Examiner* — Philip L Cotey
(74) *Attorney, Agent, or Firm* — Leydig, Voit & Mayer, Ltd.

(57) ABSTRACT

A method for determining a temperature of a fluid flowing through a pipe section includes: determining a temperature of the pipe section; obtaining a reference temperature at a distance from a surface of the pipe section; determining a heat transfer behaviour, in particular a thermal resistance, of a boundary layer of the fluid on an inner wall of the pipe section based on at least one material property and/or at least one value of a state variable of the fluid; and determining the temperature of the fluid based on the heat transfer behaviour of the boundary layer, a heat transfer behavior, in particular a thermal resistance, of the pipe section, the temperature of the pipe section, and the reference temperature.

17 Claims, 4 Drawing Sheets

(51) Int. Cl.
*G01K 7/42* (2006.01)
*G01K 13/024* (2021.01)

(56) References Cited

U.S. PATENT DOCUMENTS

| | | | | |
|---|---|---|---|---|
| 10,190,917 | B2* | 1/2019 | Decker | G01K 1/08 |
| 10,386,246 | B2* | 8/2019 | Disselnkoetter | G01K 1/143 |
| 2006/0214098 | A1* | 9/2006 | Ramos | G01F 1/6884 |
| | | | | 374/E11.015 |
| 2008/0163692 | A1* | 7/2008 | Huang | G01K 1/143 |
| | | | | 374/E1.019 |
| 2011/0320060 | A1* | 12/2011 | Batmaz | G01K 13/02 |
| | | | | 702/50 |
| 2015/0020580 | A1* | 1/2015 | Hoffman | G01K 1/026 |
| | | | | 73/61.44 |
| 2016/0047697 | A1* | 2/2016 | Decker | G01K 1/143 |
| | | | | 374/179 |
| 2016/0178446 | A1* | 6/2016 | Ude | G01K 13/02 |
| | | | | 374/107 |
| 2017/0074730 | A1* | 3/2017 | Rieder | G01K 7/427 |
| 2018/0038811 | A1* | 2/2018 | Hornung | G01N 25/005 |
| 2019/0277711 | A1* | 9/2019 | Rud | G01K 1/08 |

FOREIGN PATENT DOCUMENTS

| | | |
|---|---|---|
| CN | 107430080 A | 12/2017 |
| DE | 202015103863 U1 | 8/2015 |
| DE | 102014012086 A1 | 2/2016 |
| DE | 102014019365 A1 | 6/2016 |
| DE | 102015000728 A1 | 7/2016 |
| DE | 102016105949 A1 | 10/2017 |
| DE | 102017111242 A1 | 11/2017 |
| EP | 1014061 A1 | 6/2000 |
| WO | WO 2017131546 A1 | 8/2017 |

* cited by examiner

METHOD FOR NON-INTRUSIVELY DETERMINING THE TEMPERATURE OF A FLUID FLOWING THROUGH A CONDUIT PORTION

CROSS-REFERENCE TO PRIOR APPLICATION

This application is a continuation of International Patent Application No. PCT/EP2019/055618, filed on Mar. 6, 2019, which claims priority to European Patent Application No. EP 18160815.9, filed on Mar. 8, 2018. The entire disclosure of both applications is hereby incorporated by reference herein.

FIELD

The invention relates to a method for determining a temperature of a fluid flowing through a pipe section. Fluids are at least but not exclusively liquids, gases and bulk materials.

BACKGROUND

Such a procedure is known from WO 2017/131546 A1, for example. The method described therein is wherein between a point at which the ambient temperature is measured and a point at which a surface temperature of an outer surface of the pipe section is measured, a shaft of which the thermal resistance is known is arranged. Using the known thermal resistance and the two measured temperatures, according to the disclosure, a heat flow through the shaft and, from the heat flow, the temperature of the fluid is to be calculated. However, the method described has the serious disadvantage that the finite thermal conductivity of the fluid boundary layer is not taken into account. The method described in the disclosure therefore initially only provides an estimate of a temperature at the inner wall of the pipe.

However, for a large number of fluids and practical application scenarios, this estimate differs significantly from the average fluid temperature.

In many practically relevant cases the thermal resistance of the fluid boundary layer is much higher than that of the pipe section, for example a pipe wall.

Among other things, this disadvantage is to be remedied by the present invention.

DE 10 2014 019 365 A1 describes a measuring device for determining a temperature of a medium in a container or in a pipe. The measuring device comprises at least one temperature sensor arranged on the outside of a wall of the container or pipe with an output for the temperature it registers. The measuring device takes into account that the wall of the container or pipe acts as a PT1 element in good approximation in the transfer function with which a change in the temperature of the medium is propagated to the temperature registered by the temperature sensor. This enables the measuring device to determine a true temperature-time curve of the medium much more accurately than is possible according to the state of the art. The aim of technical teaching is to obtain the most accurate and quickest responding possible estimate of the external temperature of the container or pipe.

From DE 10 2016 105 949 A1 a non-intrusive temperature measuring device for measuring a fluid temperature in at least partially thermally insulated pipes of process industry plants is known. It discloses a non-intrusive temperature sensor with which the fluid temperature can be determined without impairing the thermal insulation of the pipes. For this purpose, the measuring device has sensor electronics with a temperature sensor and connection electronics with a processing unit. The sensor electronics are located inside the thermal insulation layer surrounding the pipe and the connection electronics outside this insulation layer. The measuring system provides for the wireless transmission of a measured temperature value from the sensor electronics to the connection electronics. The aim of this technical teaching was also exclusively to obtain a good measured value for the pipe surface temperature.

SUMMARY

In an embodiment, the present invention provides a method for determining a temperature of a fluid flowing through a pipe section, comprising: determining a temperature of the pipe section; obtaining a reference temperature at a distance from a surface of the pipe section; determining a heat transfer behaviour, comprising a thermal resistance, of a boundary layer of the fluid on an inner wall of the pipe section based on at least one material property and/or at least one value of a state variable of the fluid; and determining the temperature of the fluid based on the heat transfer behaviour of the boundary layer, a heat transfer behavior, comprising a thermal resistance, of the pipe section, the temperature of the pipe section, and the reference temperature.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
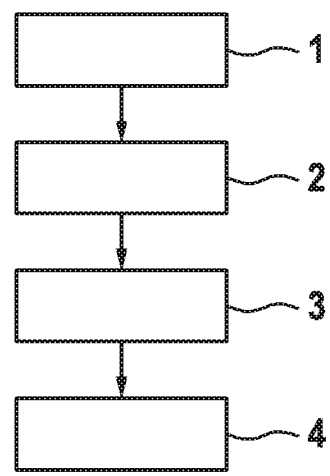
FIG. 1 shows steps of a method for determining a temperature of a fluid flowing through a pipe section.

In an embodiment, the present invention further improves a method for determining a temperature of a fluid of the generic type flowing through a pipe section in order to achieve greater accuracy in estimating the real average fluid temperature.

The temperature of the fluid determined by the method can be considered as an average temperature of the fluid over a cross-section of the pipe section (see [4]). The cross-section ends formally on the inside of the pipe wall, as far as the definition of the average temperature is concerned.

$T_m$ is defined by the convective heat flow in the pipe, and the local flow of heat capacity is used as a weight function to form the average:

$$T_m := \frac{\int_A Tc_p\rho v dA}{\int_A c_p\rho v dA}$$

A is the cross-sectional area of the fluid in the pipe section, v is the location-dependent flow velocity. $c_P$ describes the specific heat capacity of the fluid per mass, $\rho$ describes the location-dependent density.

With an incompressible flow ($\rho$=const) and constant heat capacity $c_P$, the average temperature is very simply linked to the convective heat flow $\dot q$, the mass flow $\dot m$ and the volume flow $\dot V$ linked:

$$T_m := \frac{\dot q}{\dot m c_p} = \frac{\dot q}{\rho \dot V c_p}$$

The boundary layer can be in the form of a laminar boundary layer, a turbulent boundary layer or a transition layer that has the behaviour of a laminar and/or turbulent boundary layer. The boundary layer may have a viscous underlayer. The advantage of the proposed method is that the heat transfer behaviour of the boundary layer, in particular the thermal resistance of the boundary layer, can be included in a calculation of the temperature of the fluid and thus the temperature of the fluid can be determined more accurately.

The temperature of the pipe section is preferably a surface temperature which can be measured on an outer or inner surface of the pipe section. The pipe section can be a pipe section with insulation, for example in the form of mineral wool or polyethylene foam insulation. Furthermore, the inner wall of the pipe section may be coated. It is advantageous if the temperature of the pipe section is not measured on the outer surface of the pipe section, but inside, for example inside the insulation, but on the outer wall of the actual fluid pipe. The easiest way to measure the temperature of the pipe section is to measure on the outer surface, since the outer surface is easily accessible.

The reference temperature is measured at a distance from a point at which the temperature of the pipe section is measured, so that between this point and another point at which the reference temperature is measured, a thermal resistance of the environment $R_F$ is formed. The thermal resistance of the environment can be formed, for example, by air and/or by a solid body such as a rod or a partial layer of an insulation layer of the pipe section.

The material property of the fluid can be a density $\rho$, a dynamic viscosity $\eta_f$, a thermal conductivity $\lambda_f$, a specific heat capacity $c_p$, a Prandtl number Pr and/or a phase state of the fluid. The state variable of the fluid can be a pressure p or a velocity v.

The heat transfer behaviour of the interface is preferably calculated by calculating a heat transfer coefficient $\alpha$, which depends on the velocity of the fluid in the pipe section, and the thermal conductivity of the fluid.

A possible variant for calculating the temperature of the fluid is described below. The physical principles are essentially known, e.g. from the references [1-5], and in general, for example, from the thermodynamics of heat exchangers. In a first step, a thermal resistance $R_{b1}$ of the boundary layer is calculated according to the following formula in the form of a quotient of an inner hydraulic diameter of the pipe section as a dividend and a product as a divisor. The product results from a multiplication of a Nusselt number for describing a flow state of the fluid in the pipe section with the thermal conductivity of the fluid.

$$R_{bl} = \frac{D}{Nu_D \cdot \lambda_f},$$

$$R_w = \frac{r_1}{\lambda_w}\log\frac{r_2}{r_1}\left(\text{approximately}\frac{r_2-r_1}{\lambda_w} \text{ for } r_2-r_1 \ll r_1\right)$$

In a second step, a thermal resistance $R_w$ of the pipe section, for example the pipe wall, is calculated according to the above formula. The thermal resistance of the pipe section refers to a wall segment of the pipe section between an inner surface and an outer surface of the pipe section. Instead of a logarithmic calculation as shown above in relation to an inner radius $r_1$ and an outer radius $r_2$ of the pipe section, the heat transfer behaviour of the pipe section can be carried out using a linear approximation in the form of a difference between the outer and inner radius of the pipe section. If, however, the thermal resistance of the pipe section is calculated using the logarithmic function with the quotient of the outer diameter $r_2$ and the inner diameter $r_1$ as an argument, a heat distribution within the pipe section can be approximated more precisely as described in [4].

The Nusselt number Nu can be calculated as an approximation for the case that the fluid flows in a turbulent flow in the pipe section, for example as follows:

$$Nu = 0.037 \cdot Re^{0.8} \cdot Pr^{0.42},$$

wherein Re is the Reynolds number and Pr is the Prandtl number, wherein the Prandtl number Pr and the Reynolds number Re are calculated as follows:

$$Pr = \eta_f \cdot \frac{c_p}{\lambda_f}, Re = \rho_f \cdot U_f \cdot \frac{l}{\eta_f},$$

with the dynamic viscosity $\eta_f$, the specific heat capacity $c_p$, the thermal conductivity of the fluid $\lambda_f$, the velocity of the fluid in the pipe section $U_f$, the density of the fluid $\rho_f$ and a characteristic length l. The length l can advantageously be a diameter of the fluid cross section, e.g. the hydraulic diameter d=4 A/U. Where A is the fluid cross-sectional area and U is the length of the pipe circumference wetted by the fluid. In the literature there are further approximate formulas for the functional relationship Nu(Re, Pr, 1, L) in the area of turbulent flow, wherein l is the hydraulic pipe diameter and L the approximate length of the straight inlet section before the measuring point.

In the case of laminar flow, i.e. when the approximate value is Re<2300, the Nusselt number can be written: Nu≈3.66, insofar as a homogeneous temperature can be assumed as a boundary condition at the outer shell of the pipe piece (Dirichlet boundary condition). If the boundary condition in a laminar flow case is more like a constant heat flow (von-Neumann boundary condition), Nu≈4.364 applies.

In the case of a flow in the transition range $2300 < Re < 10^4$, it is advantageous to use, for example, a linear interpolation between the value for the laminar Nusselt number assumed in the manner given above and the Nusselt number resulting from the assumed formula for the turbulent range with $Re=10^4$:

$$Nu_{trans} \approx (1-x) \cdot Nu_{lam} + x \cdot Nu_{turb}(10^4), x := (Re-2300)/(10^4-2300)$$

In a third step the temperature of the fluid $T_M$ can be calculated according to the following formula:

$$T_M = T_{wa}\left(1 + \frac{R_{bl} + R_w}{R_F}\right) - T_e \frac{R_{bl} + R_w}{R_F},$$

wherein $T_{wa}$ is the temperature of the pipe section, $T_e$ the reference temperature and $R_F$ the thermal resistance of the environment. The environment extends between the further point at which the reference temperature is measured and the point at which the temperature of the pipe section is measured. Depending on where the temperature of the pipe section is measured, the thermal resistance of the environment $R_F$ must be calculated differently. For example, if the temperature of the pipe section is measured between the surface of the pipe section and an outer surface of the insulation layer of the pipe section, a thermal resistance of an insulation material of the insulation layer is included in the calculation of the thermal resistance $R_F$.

In another variant, a heat flow I, which flows from the surface of the pipe section to the point where the reference temperature is measured, can also be determined. The heat flow I can be calculated as follows:

$$I = \frac{(T_{wa} - T_e)}{R_F},$$

The heat flow I can be used as an intermediate result for calculating the temperature of the fluid. Alternatively, the heat flow can also be determined by an estimation as described in DE 10 2017 122 442.4

The advantage of calculating the heat transfer behaviour of the boundary layer with the help of the Nusselt number is that a dependence of the Nusselt number on the velocity $u_f$ of the fluid, the density and the dynamic viscosity $\eta_f$ of the fluid and the Prandtl number has been investigated by numerous scientific experiments in the past decades and by using the Nusselt number indirectly the results of these experiments are used. Therefore, the temperature of the fluid can be determined more accurately if the Nusselt Number is included in the calculation of the temperature of the fluid.

In order to determine the optimum Nusselt number for the laminar region, it can be advantageous to estimate whether the application situation corresponds more to Dirichlet or von Neumann boundary conditions or to a special impedance or Robin boundary condition. Depending on this, it is advantageous to set the laminar Nusselt number for the measured value correction.

A preferred embodiment of the method is that the material property of the fluid is determined by at least one measurement. For example, the thermal conductivity of the fluid upstream of the pipe section can be determined by the measurement. This has the advantage that the material property does not have to be entered manually into a system for calculating the temperature of the fluid. In addition, the measurement can be used to determine the material property more accurately, since the fluid has material properties that change with temperature. It is advantageous to measure the material property with the help of a measuring instrument which is installed in a system in which the pipe section is installed upstream of the pipe section. The measuring instrument can, for example, be used to measure a Reynolds number or the pressure of the fluid. The measurement indirectly allows an approximation of the material property.

According to a further embodiment, the heat transfer behaviour of the pipe section is determined by means of a material property of the pipe section, wherein the material property of the pipe section, for example a thermal conductivity $\lambda_w$ of the pipe section, is determined by at least one measurement.

A particularly advantageous design provides for the material property of the fluid and/or the material property of the pipe section to be recorded by means of an initial input interface of the system. The advantage of this design is that a user can carry out the proposed procedure for determining the temperature of the fluid on different systems and with different fluids. This makes the procedure or a system that carries out the procedure very flexible. The material properties can be the above mentioned material properties of the fluid, such as density, dynamic viscosity, thermal conductivity, specific heat capacity, etc.

A further improvement of the method can provide that a value of a variable influencing the heat transfer behaviour of the pipe section is recorded by means of the first or a second input interface.

This quantity can be a diameter of the pipe section, in particular a hydraulic diameter obtained with the help of data of a cross-sectional geometry of the pipe section if the pipe section is not round, a thickness of a wall of the pipe section, the thermal conductivity of the pipe section λw, a specific heat capacity of a material of the pipe section, a thickness of a coating of the pipe section, be a thermal conductivity and/or a specific heat capacity of the coating, a thickness of the insulation layer, a thermal conductivity and/or a specific heat capacity of the insulation layer, a coefficient of friction, in particular a Darcy-Moody-Weisbach coefficient of friction, which can be calculated according to [3, 4], or a roughness factor of the inner wall of the pipe section, which is calculated according to Nikuradze sand [5].

Furthermore, it may be advantageous to record a value of a process variable of a process in which the fluid is used as a medium using the first, second or third input interface and to calculate the temperature of the fluid using the value of the process variable. The process variable can be the Reynolds number, the Prandtl number or the Nusselt number of a flow formed by the fluid.

The advantage of using the process variable is that a model which is used, for example, to calculate the heat transfer behaviour of the boundary layer can have the value of the process variable as input variable. The value of the process variable can replace several values of material properties of the fluid and/or variables influencing the heat transfer behaviour of the pipe section. In this way, a number of input values of the model to be obtained can be reduced, thereby reducing one dimension of a parameter space formed by parameters such as the material properties of the fluid and the variables influencing the heat transfer behaviour of the pipe section. A smaller dimension of the parameter space makes it easier to generate the model and use the model to approximate the heat transfer behavior of the boundary layer.

Advantageous further training provides that a slope of the pipe section is detected and a warning is issued to a user depending on the slope. The warning contains information about the accuracy of the determined temperature of the fluid. This makes it possible to give the user a basis for deciding whether the determined temperature of the fluid is inaccurate.

In a further variant, it may be provided that an indication of the type of fluid is recorded and the material property of the fluid is determined with the help of the indication. The specification can be a type of fluid, for example. For example, a word such as "oil" can be read in using the input interface or a fourth input interface, which can be the specification for typing. In this case it is advantageous to read all the material properties of oil from a database, which makes it easy to provide information for determining the material properties of the fluid.

It is particularly advantageous to determine the material properties of the fluid as a function of temperature, which allows higher accuracy to be achieved.

In line with an embodiment of the method, the material property of the fluid can be determined as a function of an estimated temperature of the fluid, in particular on the basis of the temperature of the pipe section, and the temperature of the fluid can first be determined as a function of the estimated temperature. The estimated temperature is preferably determined as a function of an estimator which has the temperature of the pipe section and/or the reference temperature as an argument.

The temperature of the fluid is determined using the material properties of the fluid determined as a function of the estimated temperature according to one of the above variants. The temperature of the fluid determined in this way may then be used to recalculate the material properties as a function of this calculated temperature of the fluid. The temperature of the fluid can be determined again using the newly determined material properties of the fluid. Preferably, a difference between the newly determined temperature of the fluid and the previously determined temperature of the fluid is output using an output unit.

Preferably, the temperature of the fluid is determined by previously determining a heat flow through the boundary layer and the wall of the pipe section.

A particularly precise variant of the method involves determining a value of the Reynolds number describing the flow of the fluid and, depending on the value of the Reynolds number, using one of at least two different models to calculate the Nusselt number. The Reynolds number can be calculated as described above.

Advantageously, for values of the Reynolds number smaller than about 2300, a first model is used for the calculation of the Nusselt number for a laminar flow, for values of the Reynolds number between about 2300 and 10000, a second model is used for the calculation of the Nusselt number for a flow in a transition region, and for values of the Reynolds number larger than about 10000, a third model is used for the calculation of the Nusselt number for turbulent flows. In order to select a suitable one of at least two different models for different applications, it is advantageous to carry out an experimental calibration of the different models, i.e. the first, second and third model. By means of the method of fuzzy logic, results of at least two of the different models can also be included in the calculation of the Nusselt number.

Preferably, the temperature of the pipe section is measured with a temperature sensor. A feeder temperature sensor device described in DE 10 2014 012 086 A1 can be used for this purpose, in which a reduction in heat exchange of a tapping surface of a temperature sensor applied to the pipe section is achieved. In addition, a double sensor described in DE 10 2017 122 442.4 can be used for an accurate measurement of the temperature of the pipe section.

A further variant can provide for modelling the temperature of the pipe section using a temperature model. In this case it is advantageous to use databases. The databases preferably indicate a temperature of the pipe section depending on different operating points of the plant in which the pipe section is located. The reference temperature is preferably an ambient temperature, which is measured using a sensor, which is arranged in a housing of an evaluation unit or in a free environment.

To solve the problem, a system for determining the temperature of a fluid flowing through a pipe section is further on proposed. The system comprises an evaluation unit and a first temperature sensor, the evaluation unit being set up to detect a temperature of the pipe section, to detect a reference temperature measured using the first temperature sensor at a distance from a surface of the pipe section, a heat transfer behaviour, in particular a thermal resistance, of a boundary layer of the fluid on an inner wall of the pipe section on the basis of at least one material property and at least one value of a state variable of the fluid and to determine the temperature of the fluid on the basis of the heat transfer behaviour of the boundary layer, a heat transfer behaviour, in particular a thermal resistance, of the pipe section, the temperature of the pipe section and the reference temperature.

Figure 2:
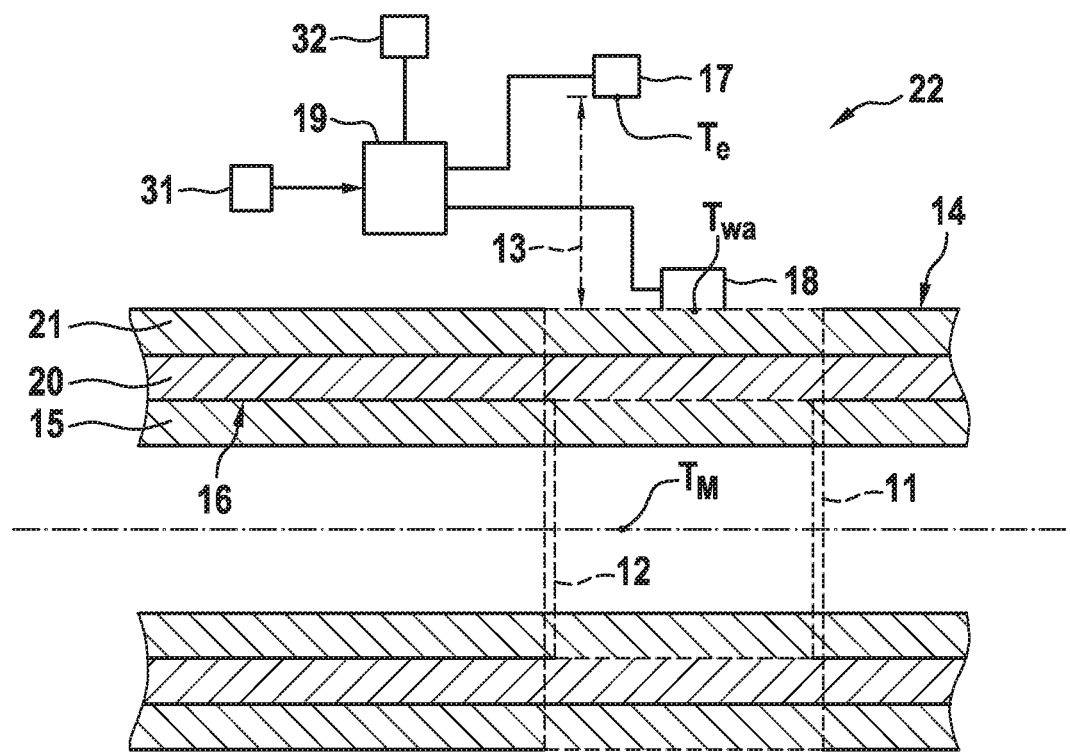
FIG. 2 shows a pipe section, a fluid with a boundary layer on an inner wall of the pipe section.

FIG. 1 shows steps of a method for determining a temperature $T_M$ of a fluid 12 flowing through a pipe section 11, which is shown in FIG. 2. In a first step 1 a temperature $T_{wa}$ of the pipe section 11 is determined. In a second step 2, a reference temperature $T_e$ is measured at a distance from a surface 14 of the pipe section 11. In a third step 3, a heat transfer behaviour, in particular a thermal resistance, of a boundary layer 15 of the fluid 12 on an inner wall 16 of the pipe section 11 is determined on the basis of at least one material property and at least one value of a state variable of the fluid 12.

In a fourth step 4, the temperature $T_M$ of the fluid 12 is determined on the basis of the heat transfer behaviour of the boundary layer 15, a heat transfer behaviour, in particular a thermal resistance of the pipe section 11, the temperature $T_{wa}$ of the pipe section and the reference temperature $T_e$. The reference temperature $T_e$ is preferably measured by means of a first temperature sensor 17 and the temperature $T_{wa}$ of the pipe section 11 by means of a second temperature sensor 18. The first temperature sensor 17 is positioned at a distance 13 from the second temperature sensor 18. The temperature values measured with the first temperature sensor 17 and the second temperature sensor 18 are forwarded to an evaluation unit 19. The evaluation unit 19, the first temperature sensor 17, the second temperature sensor 18 form a system 22 for determining the temperature of the fluid 12.

Figure 3:
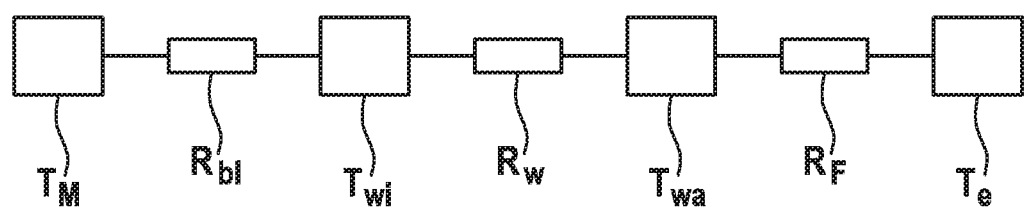
FIG. 3 shows a thermal network with a thermal resistance of the boundary layer according to FIG. 2.

FIG. 3 shows in simplified form a thermal network extending between a location where the temperature $T_M$ of the fluid prevails and a location where the reference temperature $T_e$ is measured. Starting from the location where the temperature $T_M$ of the fluid 12 prevails, a heat flow is made through the boundary layer 15, through a wall 20 of the pipe section 11, preferably through an insulation layer 21, and through a medium extending between a location where the temperature $T_{wa}$ of the pipe section 11 is measured and the location where the reference temperature $T_e$ is measured, towards the location where the reference temperature $T_e$ is obtained. Accordingly, the boundary layer 15 forms a thermal resistance $R_{bl}$ of the boundary layer 15, the wall 20 and the insulation layer 21 form a thermal resistance $R_w$ of the pipe section 11 and the medium extending between the insulation layer 21 and the location at which the reference temperature $T_e$ is measured forms a thermal resistance of an environment $R_F$.

The heat flow I can be calculated using the formula described above. It is possible that, deviating from the variant shown in FIG. 2, the temperature $T_{wa}$ of the pipe section 11 which is inside the wall 20 or inside the insulation layer 21 is recorded. In this case, the thermal resistance of the pipe section $R_w$ and the thermal resistance of the environment $R_F$, which extends between the location where the temperature $T_{wa}$ of the pipe section 11 is measured and the location where the reference temperature $T_e$ is measured, are calculated in a different way. The temperature $T_M$ of the fluid 12 is preferably determined according to one of the above formulas.

Figure 4:
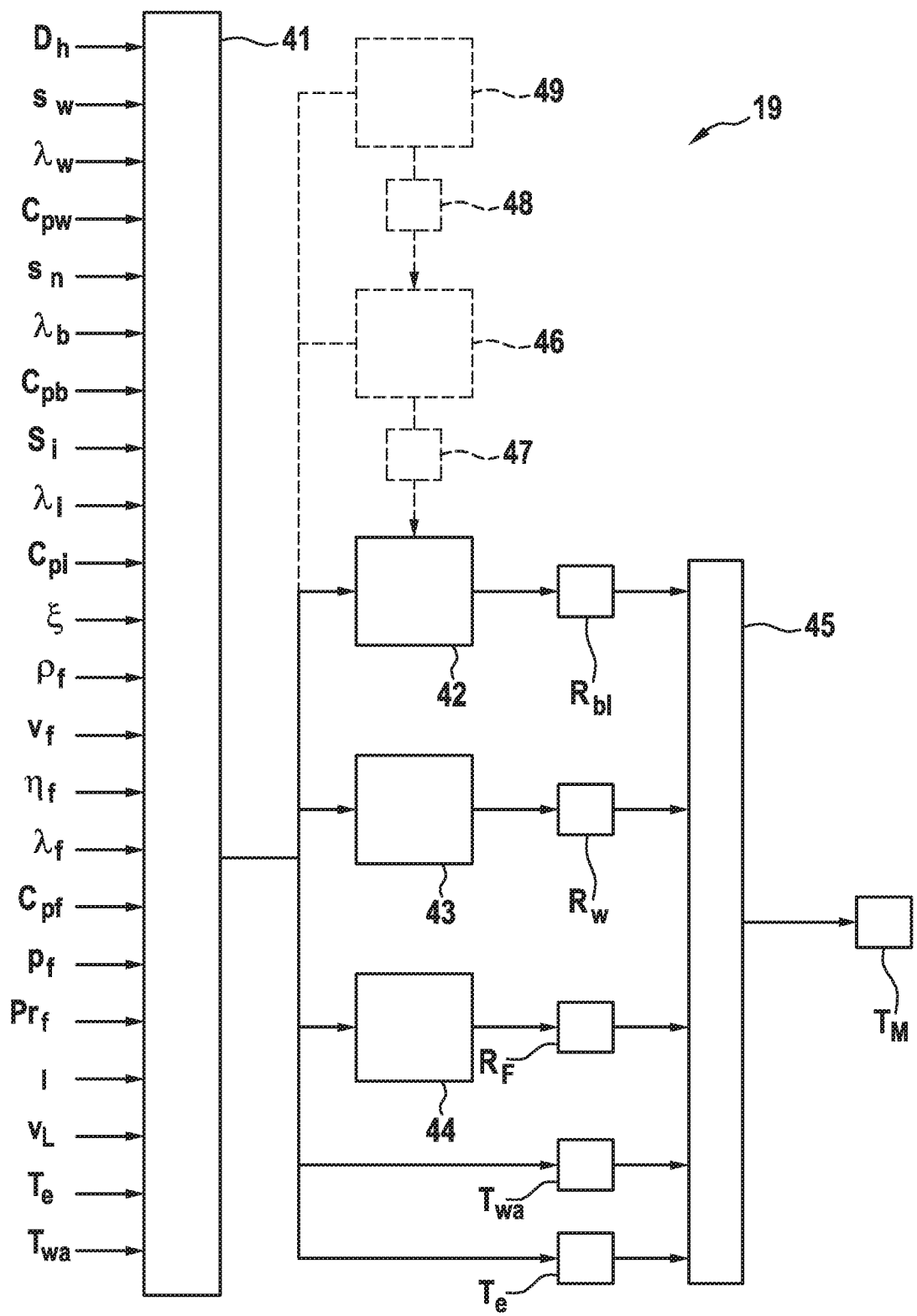
FIG. 4 shows an evaluation unit for determining the temperature of the fluid according to FIG. 2.

FIG. 4 shows an embodiment of the evaluation unit 19, which determines the temperature $T_M$ of the fluid 12 at least on the basis of the recorded temperatures $T_e$ and $T_{wa}$. Preferably, evaluation unit 19 has an interface 41 which reads in at least one value of at least one input variable. It is advantageous for interface 41 to read in several values of several input variables each.

The input variables may include a hydraulic diameter $D_H$ of the pipe section 11, a thickness $s_w$ of the wall 20, a thermal conductivity $\lambda_w$ of the wall 20, a specific heat capacity $C_{p_w}$ of the wall 20, a thickness $s_b$ of a coating on the inner wall 16, a thermal conductivity $\lambda_b$ of the coating, a specific heat capacity $C_{p_b}$ of the coating, a thickness $s_i$ of the insulation layer 21, a thermal conductivity $\lambda_i$ of the insulation layer 21, a specific heat capacity $C_{p_i}$ of the insulation layer 21, a coefficient of roughness $\xi$, a surface of the inner wall 16, a density $\rho_f$ of the fluid 12, a velocity vf of the fluid 12, a dynamic viscosity $\eta_f$ of the fluid 12, a thermal conductivity $\lambda_f$ of the fluid 12, a specific heat capacity $C_{p_f}$ of the fluid 12, a pressure $p_f$ of the fluid 12, a Prandtl number $Pr_f$ of the fluid 12, a distance 1 between the location, at which the temperature $T_{wa}$ of the pipe section 11 is measured, and a location at which the fluid 12 enters a pipe comprising the pipe section 11, a velocity $v_L$ of air flowing around the pipe section 11, the reference temperature $T_e$ and/or the temperature $T_{wa}$ of the pipe section 11.

The evaluation unit 19 preferably has a first model 42 for calculating the thermal resistance $R_{bl}$, a second model 43 for calculating the thermal resistance $R_w$ and a third model 44 for calculating the thermal resistance $R_F$.

The interface 41 provides the input variables for the first, second and third models 42, 43, 44 to calculate the respective thermal resistances. For example, the first model 42 calculates the thermal resistance $R_{bl}$ of boundary layer 15 as a function of the hydraulic diameter $D_h$, the roughness coefficient $\xi$, the density of the fluid $\rho_f$, the velocity of the fluid $v_f$, the dynamic viscosity $\eta_f$, the thermal conductivity $\lambda f$, the specific heat capacity $C_{p_f}$, the Prandtl number $Pr_f$, the distance 1 and preferably the pressure $p_f$.

The second model 43 calculates the thermal resistance $R_w$ preferably as a function of the thickness $s_w$ of the wall, the thermal conductivity $\lambda_w$, the specific heat capacity $C_{p_w}$, the thickness of the coating $s_b$, the thermal conductivity $\lambda_b$ of the coating, the specific heat capacity $C_{p_b}$ of the coating, the thickness $s_i$ of the insulating layer, the thermal conductivity $\lambda_i$ of the insulating layer and the specific heat capacity $C_{pi}$ of the insulating layer. The third model 44 calculates the thermal resistance $R_F$ preferably as a function of the distance 13, the velocity $v_L$ of the air and the reference temperature $T_e$. As a function of the thermal resistances $R_{bl}$, $R_w$, $R_F$ and the recorded temperatures $T_{wa}$ and $T_e$, a calculation module 45 of the evaluation unit 19 calculates the temperature $T_M$ of the fluid 12 preferably according to the above formula.

To calculate the thermal resistance $R_{bl}$ of the boundary layer 15, the first model 42 can advantageously have as input variable a Nusselt number 47 calculated with a fourth model 46. The Nusselt number 47 can also be calculated with the help of the fourth model 46 in a particularly preferred variant depending on a Reynolds number 48 calculated with a fifth model 49. The fourth model 46 preferably provides for a case distinction depending on a value of the calculated Reynolds number 48. Depending on the value of the Reynolds number 48, the fourth model 46 can use calculation results of the above mentioned first, second and/or third model to calculate the Nusselt number.

The input variables of interface 41 shown in FIG. 4 can be entered manually in a first variant using an input interface 31. In a second variant, a large part of the input variables of interface 41 can be calculated using databases 32 connected to evaluation unit 19. A special variant of the proposed procedure provides that using of the input interface 31, an indication 51 for the typification of the fluid 12 is entered and at least one of the substance properties of the fluid 12 is determined using the indication 51. It is advantageous to continue to determine the material property of the fluid as a function of an estimated temperature $T_g$ of fluid 12. The estimated temperature $T_g$ may be equal to the measured temperature $T_{wa}$ of the pipe section 11.

Figure 5:
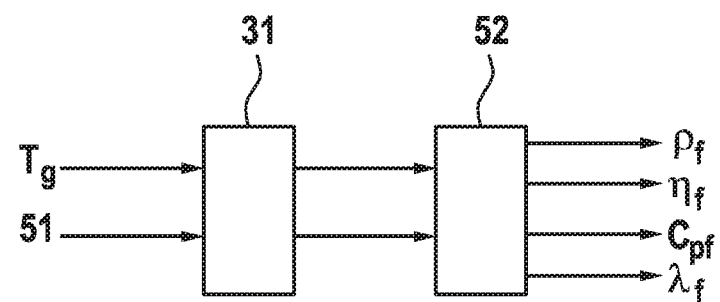
FIG. 5 shows a model for determining at least one material property of the fluid according to FIG. 2 as a function of an estimated temperature.

FIG. 5 shows a variant in which a sixth model 52 of the evaluation unit 19 calculates the density $\rho_f$, the dynamic viscosity $\eta_f$, the specific heat capacity $C_{p_f}$ and the thermal conductivity $\lambda_f$ of the fluid 12 as a function of the estimated temperature $T_g$ and the indication 51. For this calculation, tables known in the prior art can be used. A particularly precise form of the proposed method provides that at least one material property is first calculated as a function of the estimated temperature $T_g$ and then the temperature $T_M$ of the fluid 12 is determined as a function of this material property using the method described above. Subsequently, the improved method provides for at least one substance property of fluid 12 to be recalculated on the basis of the determined temperature $T_M$ of fluid 12. The calculation of material properties of fluid 12 as a function of temperature can be carried out according to [1].

Figure 6:
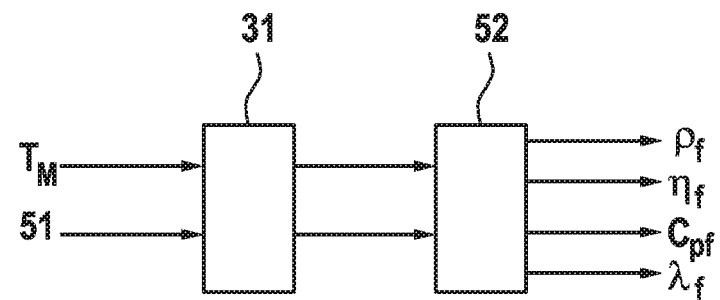
FIG. 6 shows the model for determining at least one material property of the fluid according to FIG. 5 as a function of a temperature of the fluid according to FIG. 2.

FIG. 6 shows how the sixth model 52 recalculates the density $\rho_f$, the dynamic viscosity $\eta_f$, the specific heat capacity $C_{p_f}$ and the thermal conductivity $\lambda_f$ of fluid 12 as a function of the calculated temperature $T_M$ of fluid 12. Depending on these recalculated material properties of the fluid 12, the temperature $T_M$ of the fluid 12 can be calculated again using the procedure described above. This repeated calculation of the temperature $T_M$ of fluid 12 can be performed iteratively until a change in the temperature $T_M$ of fluid 12 is below a given threshold. The indication 51 for typing can be in the form of a string, for example "oil". The input interface 31 evaluates the indication 51 in such a way that corresponding formulas for the calculation of the material properties of a fluid, which is specified by means of the indication 51, are read from a material database for the calculation of the material properties of the fluid 12 and used for the calculation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 1 first step
2 second step
3 third step
4 fourth step
11 pipe section
12 fluid
13 distance
14 surface
15 boundary layer
16 inner wall of the pipe section
17 first temperature sensor
18 second temperature sensor
19 evaluation unit
20 wall
21 insulation layer
22 system
31 input interface
32 databases
41 interface
42 first model
43 second model
44 third model
45 calculation module
46 fourth model
47 Nusselt number
48 Reynolds number
49 fifth model
51 Indication
52 sixth model

What is claimed is:

1. A method for determining a temperature of a fluid flowing through a pipe section, the method comprising:
    determining a temperature of the pipe section;
    obtaining a reference temperature at a distance from a surface of the pipe section;
    determining a heat transfer behavior, comprising a thermal resistance, of a boundary layer of the fluid on an inner wall of the pipe section based on at least one material property and/or at least one value of a state variable of the fluid; and
    determining the temperature of the fluid based on the heat transfer behavior of the boundary layer, a heat transfer behavior, comprising a thermal resistance, of the pipe section, the temperature of the pipe section, and the reference temperature.

2. The method according to claim 1, wherein the heat transfer behavior of the boundary layer is calculated using a Nusselt number for describing a flow state of the fluid.

3. The method according to claim 1, wherein the at least one material property of the fluid is determined by at least one measurement.

4. The method according to claim 1, wherein the heat transfer behavior of the pipe section is determined based on a material property of the pipe section, the material property of the pipe section being obtained by at least one measurement.

5. The method according to claim 1, wherein the at least one material property of the fluid is obtained using a first input interface.

6. The method according to claim 5, wherein a value of a variable influencing the heat transfer behavior of the pipe section is obtained by the first input interface or a second input interface.

7. The method according to claim 6, wherein a value of a process variable of a process in which the fluid is used as a medium is obtained by the first input interface, the second input interface, or third input interface, and the temperature of the fluid is calculated using the value of the process variable.

8. The method according to claim 7, wherein the process variable is a Reynolds number of a flow formed by the fluid.

9. The method according to claim 7, wherein the process variable is a Prandtl number of a flow formed by the fluid.

10. The method according to claim 7, wherein the process variable is a Nusselt number of a flow formed by the fluid.

11. The method according to claim 1, wherein an inclination of the pipe section is obtained and a warning is output to a user based on the inclination, the warning containing an information about an accuracy of the determined temperature of the fluid.

12. The method according to claim 1, wherein an indication for typing the fluid is recorded and the at least one material property of the fluid is determined using the indication.

13. The method according to claim 1, wherein the at least one material property of the fluid is determined as dependent on the temperature.

14. The method according to claim 13, wherein the at least one material property of the fluid is determined dependent on an estimated temperature of the fluid, based on the temperature of the pipe section, and the temperature of the fluid is first determined based on the estimated temperature.

15. The method according to claim 14, wherein the temperature of the fluid is determined again, the at least one material property of the fluid being determined based on the previously determined temperature of the fluid.

16. The method according to claim 1, wherein a value of a Reynolds number describing a flow of the fluid is determined, and depending on the value of the Reynolds number, one of at least two different models is used to calculate the Nusselt number.

17. A system for determining a temperature of a fluid flowing through a pipe section, the system comprising:
    an evaluation unit; and
    a first temperature sensor,
    wherein evaluation unit is configured:
        to obtain a temperature of the pipe section,
        to obtain a reference temperature measured by using the first temperature sensor at a distance from a surface of the pipe section,
        to determine a heat transfer behavior, comprising a thermal resistance, of a boundary layer of the fluid on an inner wall of the pipe section based on at least one material property and at least one value of a state variable of the fluid, to determine the temperature of the fluid based on the heat transfer behavior of the boundary layer, a heat transfer behavior, comprising a thermal resistance, of the pipe section, the temperature of the pipe section, and the reference temperature.

\* \* \* \* \*